(12) United States Patent
Havemose

(10) Patent No.: US 6,757,903 B1
(45) Date of Patent: Jun. 29, 2004

(54) OBJECT DRIVEN SOFTWARE ARCHITECTURE METHOD AND APPARATUS

(75) Inventor: Allan Havemose, San Jose, CA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/312,123

(22) Filed: May 14, 1999

Related U.S. Application Data

(60) Provisional application No. 60/127,767, filed on Apr. 5, 1999.

(51) Int. Cl.[7] .................................................. G06F 9/00
(52) U.S. Cl. ..................................................... 719/319
(58) Field of Search ........................... 709/319; 719/319

(56) References Cited

U.S. PATENT DOCUMENTS

| | | | | |
|---|---|---|---|---|
| 5,511,197 A | * | 4/1996 | Hill et al. .................... | 709/328 |
| 5,689,664 A | * | 11/1997 | Narayanan et al. ......... | 345/769 |
| 5,848,234 A | * | 12/1998 | Chernick et al. ........... | 709/203 |
| 6,256,779 B1 | * | 7/2001 | Martin ........................ | 717/116 |

OTHER PUBLICATIONS

Keshab K.Parhi, Programmable and Configurable Digit–Serial Signal Processors, 1997.*

Krste Asanovich, Instruction set architecture, 1996.*

* cited by examiner

Primary Examiner—Meng-Al T. An
Assistant Examiner—Lechi Truong
(74) Attorney, Agent, or Firm—Scott Charles Richardson; Peng Zhu

(57) ABSTRACT

The present invention provides an object driven software architecture that allows objects written in any programming language running on any operating system or hardware to communicate with any other object written in any other programming language running on any other operating system or any other hardware including objects executing on the same system or executing on different systems coupled via a network.

23 Claims, 14 Drawing Sheets

OBJECT DRIVEN SOFTWARE ARCHITECTURE METHOD AND APPARATUS

CROSS REFERENCE TO RELATED APPLICATION

The present application claims priority under 35 U.S.C. § 119 of U.S. Provisional Patent Application 60/127,767 filed on April 5, 1999.

FIELD OF THE INVENTION

The present invention relates generally to the fields of distributed computer systems, object-oriented programming, and distributed object environments, and more specifically to methods and apparatus for implementing and using an object-oriented system architecture and operating environment for digital information appliances, networked computers/devices, and conventional computers.

BACKGROUND OF THE INVENTION

Digital information appliances (DIA) are electronic devices designed to perform a specific function or group of functions more efficiently than would a conventional computer system. Like computer systems, information appliances may be interconnected with a network such as the INTERNET to provide content and functions which would not be available when the appliances operated independently. Preferably, such network connections are transparent to the user so that the complexity of the underlying computer network is masked. In this manner, information appliances provide advantages in simplicity of operation and computing ease of use to their users.

As the proliferation of digital information appliances accelerates, it will become necessary to develop a standard system architecture and operating environment to facilitate their use and interconnection with each other and other networked devices. Such a system architecture may utilize a distributed object model employing object oriented programing methods. Object oriented programming is a programming paradigm (method) wherein a program is organized as a collection of discrete objects that are self-contained collections of data structures and routines that interact with that data. Such objects encapsulate related data and procedures so as to hide that information by allowing access to the data and procedures only through the object's published interface. Hence changes to the data and or procedures of the object are isolated from other objects. This provides an architecture that is more easily maintained since changes to an object's code does not affect other objects.

Likewise, object oriented programming methods provide for inheritance of an object's characteristics into another class of object. Thus, an object may be derived from a first object to form a second object which "inherits" certain properties of its parent object. This allows for both (1) the formation of subclasses of objects having more specialized features and/or capabilities, and (2) the reuse of individual objects in different programs. Thus, libraries of proven objects may be developed which may be used repeatedly in different applications.

In developing a standard appliance system architecture, it is desirable to allow access to objects in a transparent fashion so that objects created in different programming languages and objects residing on different appliances, network servers, or computer systems that are networked together are accessible to the user without extensive modification of the user's programming code. For computer networks, this capability may be provided by object oriented distributed environments such as the common object request broker architecture (CORBA). Such system architectures are based upon a client-server model, in which object servers provide public interfaces to object-clients that make requests of the object servers. Typically in such systems, the servers are objects consisting of data and associated methods. The object clients obtain access to the object servers by sending them messages which are mediated by the distributed system. When the server object receives the message it invokes the appropriate method and transmits the result back to the object client. The object-client and object server communicate through an Object Request Broker (ORB) which is used to locate the various distributed objects and establish communication between the objects and the client. However, such existing distributed object architectures require that all transactions (communications between client objects and server objects) must pass through an ORB. As a result, the ORB becomes a single failure point which could potentially disable such a system. Further, an ORB typically requires a large amount of memory. Thus, architectures such as CORBA would be unsuitable for "thin" (simple) appliances which have a limited amount of memory. The JIM technology from Sun Microsystems is another attempt at addressing the same problem. The architecture and implementation of JIM is similar to that of CORBA in a number of ways: JINI-enabled devices typically communicate with a JINI server, wherein the server acts as a central node in the JINI network. The JINI Server will upload drivers and services to each JINI device as needed. When using a server, JINI has the same fault problems as CORBA. When JINI is operated without a server it provides a very small feature set.

In a distributed environment the architecture has to enable devices with different hardware architecture, software architecture and operating systems to operate together. CORBA addresses this by requiring that CORBA applications use an interface description language (IDL) to communicate with the server. JIM addresses this by specifying communication protocols (i.e. by utilizing JAVA), thereby relying on JAVA resolving most of the architectural differences. In both cases, the architecture imposes a new language on the developer of the devices on the network.

For many types of computing devices it may also be necessary to transparently remote the execution of an object. Remoting execution allows an object to live and move around on the network. That allows for applications where resources and capabilities on the network automatically can be requested and invoked by any one device. CORBA does not have such a capability and JIM/JAVA have no automatic transparent remote capability. In JAVA all remote execution is created and controlled by the application, typically using the RMI environment within the Java language.

Consequently, it would be advantageous to develop an object oriented system which, for example could be employed as a standard appliance system architecture. Such an information appliance transaction system would provide greater fault tolerance than conventional object based architectures, and may be implemented on thin appliances having a limited amount of memory. The system architecture should allow management of transactions performed through the information appliances, transparent use of resources locally or on the network, and allow information appliances to be created in any software programming language.

SUMMARY OF THE INVENTION

The present invention provides an object driven software architecture that allows objects written in any programming language running on any operating system or hardware to communicate with any other object written in any other programming language running on any other operating system or any other hardware including objects executing on the same system or executing on different systems coupled via a network.

In one embodiment of the invention, the object driven software architecture provides the capability to execute transactions, including financial transactions, across a distributed network. The present invention allows for appliance transaction system allows content/service providers to control distribution of the content or services they furnish, and provides novel business process features such as automatic micro-billing of events and instances wherein minuscule requests and tasks of very low value may be billed and monies collected where doing so was otherwise impractical. The distributed object architecture provides dynamic support for multiple simultaneous payment algorithms and for easily modifying or updating the payment algorithms as desired. Further, the present invention provides for automatic offline or online transactions with deferred connections such that payment for a transaction may be secured prior to actually completing the transaction such that the user may obtain the paid for content even without an immediate network connection. Additionally, the present invention provides central authentication of objects of the system such that one object may verify the validity of any other object.

The invention further provides a digital appliance that is capable of utilizing the distributed object system without regard to whether the appliance is embodied as a hardware device or embodied as software (i.e. a virtual appliance) capable of being executed by any other hardware device such that the hardware device is indistinguishable from the software device.

To accomplish the above listed objects, the present invention provides a method for executing a task in a distributed object information handling system. In one embodiment, the method includes steps for calling an object to execute a task requested by an application by transferring the request to an interface object, locating an implementation object for executing the task, upon locating the implementation object, creating an instance of the implementation object and then passing the request from the interface object to the implementation object, executing the task with the implementation object whereby a result of the task is produced, passing the result from the implementation object to the interface object, and passing the result to the application.

To further accomplish the above listed objects, the present invention provides a distributed object information handling system. In one embodiment, the information handling system includes an interface object for interfacing with an application, a message bus for passing information between the interface object and an implementation object, and an executive for locating the implementation object wherein the executive creates an instance of the implementation object upon locating the implementation object such that the implementation object executes a task requested by the application and passes a result of the task to the application via the interface object.

In further accomplishment of the above listed objects, the present invention provides a system for implementing a transaction in a distributed object information handling system. In one embodiment, the system includes means for transmitting a request that requires a transaction, the transmitting means including an interface object for interfacing with an application generating the request, means for authorizing the transaction, the authorizing means including a first implementation object for receiving the request, authorizing the transaction, and for transmitting authorization of the transaction, and means for executing the task, the executing means including a second implementation object for receiving authorization of the transaction and for transmitting a result of the task to the transmitting means.

To additionally accomplish the above listed objects, the invention provides a method for billing a transaction on a distributed object system. In one embodiment, the method includes steps for receiving a command to perform a task, determining whether the task has been paid for by querying a counter object, in the event the task has been paid for, incrementing the counter object, and performing the task.

Furthermore, to accomplish the above listed objects, the present invention provides a method for optimally selecting an object in a distributed object system. In one embodiment, the method includes steps for monitoring utilization of an appliance, storing object utilization information for identifying previously performed tasks, determining whether to utilize a previously performed task, and, in the event it is determined to utilize a previously performed task, loading a corresponding object for executing the previously performed task.

It is to be understood that both the forgoing general description and the following detailed description are exemplary and explanatory only and are not restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
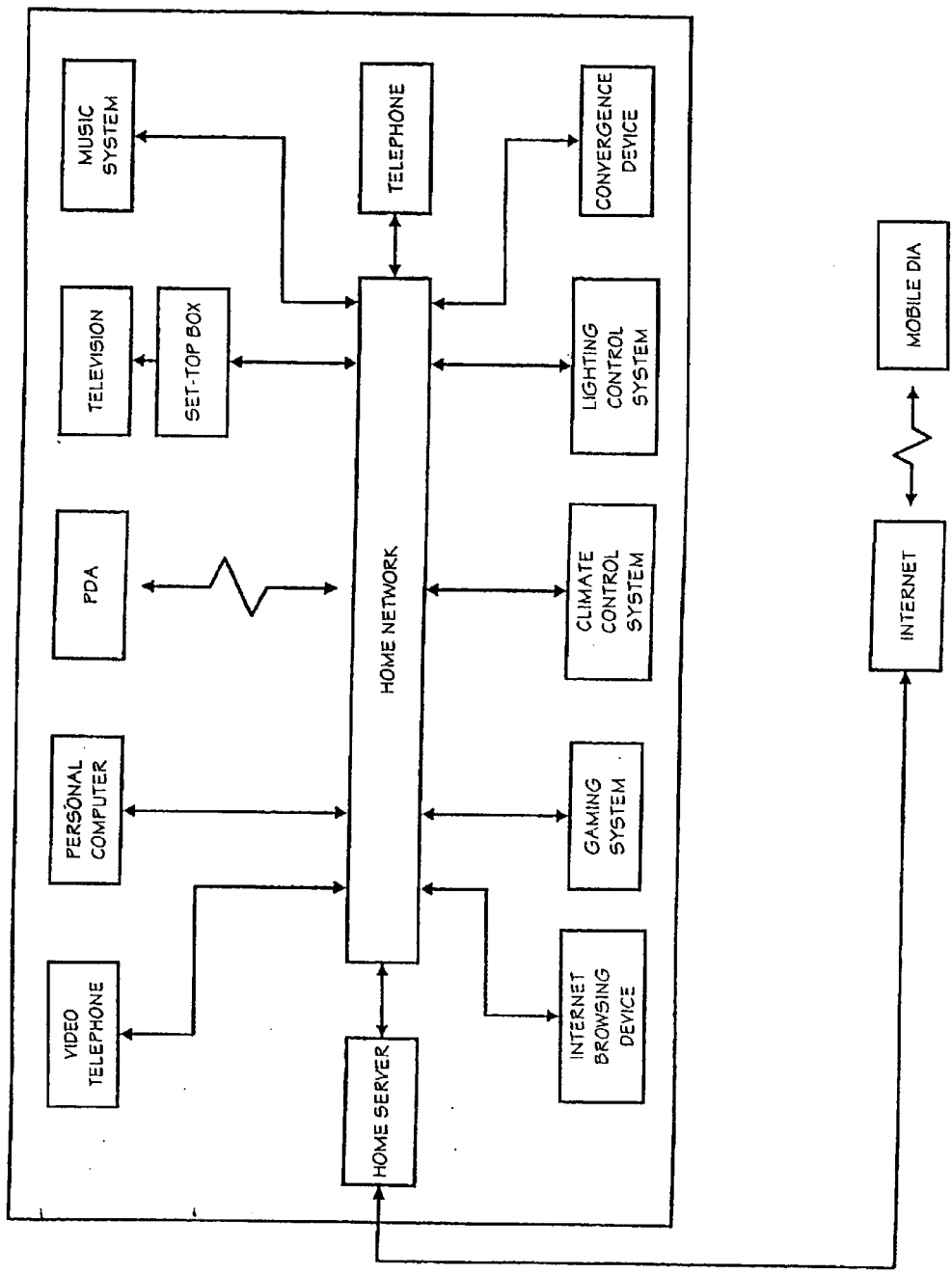
FIG. 1 is a block diagram illustrating a network of information appliances having a local and a global portion operated at least partially by the architecture of the present invention.

The present invention includes a system architecture and operating environment for digital information appliances (DIAs) which allows for feature and feature enhancements for digital information appliances and the like. A DIA is any electronic device capable of operating on a computer network in batch or real-time. Most DIA's include an I/O, a ROM, and a memory. DIAs include both single feature and multiple feature devices. In a preferred embodiment, DIAs operate in the network of the present environment with general purpose computers and the like (FIG. 1).

A. System Architecture and Operating Environment

Figure 2:
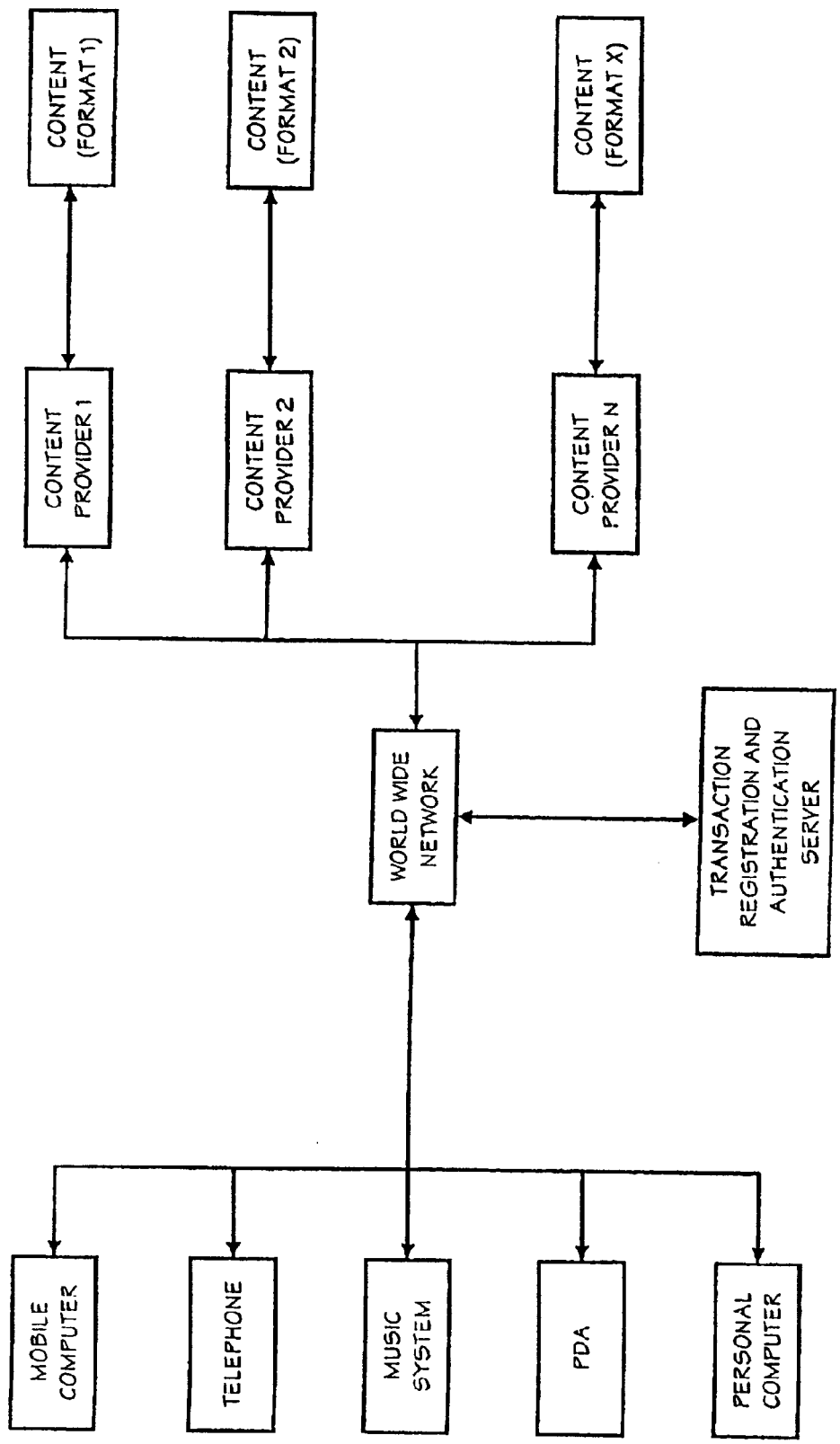
FIG. 2 is a block diagram illustrating content exchange between computers and information appliances over a network at least partially operated by the architecture of the present invention.

To best understand the many novel and innovative features of the present invention, a discussion of the underlying system architecture and operating environment is in order. The system architecture and operating environment (herein after "the architecture") includes an object hierarchy and object administrator. Together the object hierarchy and object administrator provide additional services not offered by the underlying operating system. The architecture of the present invention creates a scalable, object driven software architecture that supports both simple appliances, network computers/devices and general purpose computers such as personal computers, servers, "mainframe" computers, and "super" computers (FIG. 2).

The architecture of the present invention supports the creation of compelling and easy-to-use consumer and desktop user-interfaces. Additionally, networking within the architecture of the present invention is pervasive, i.e., resources on the network behave as local resources and execution is transportable across network boundaries.

1. Dynamic Base-Objects

Figure 9:
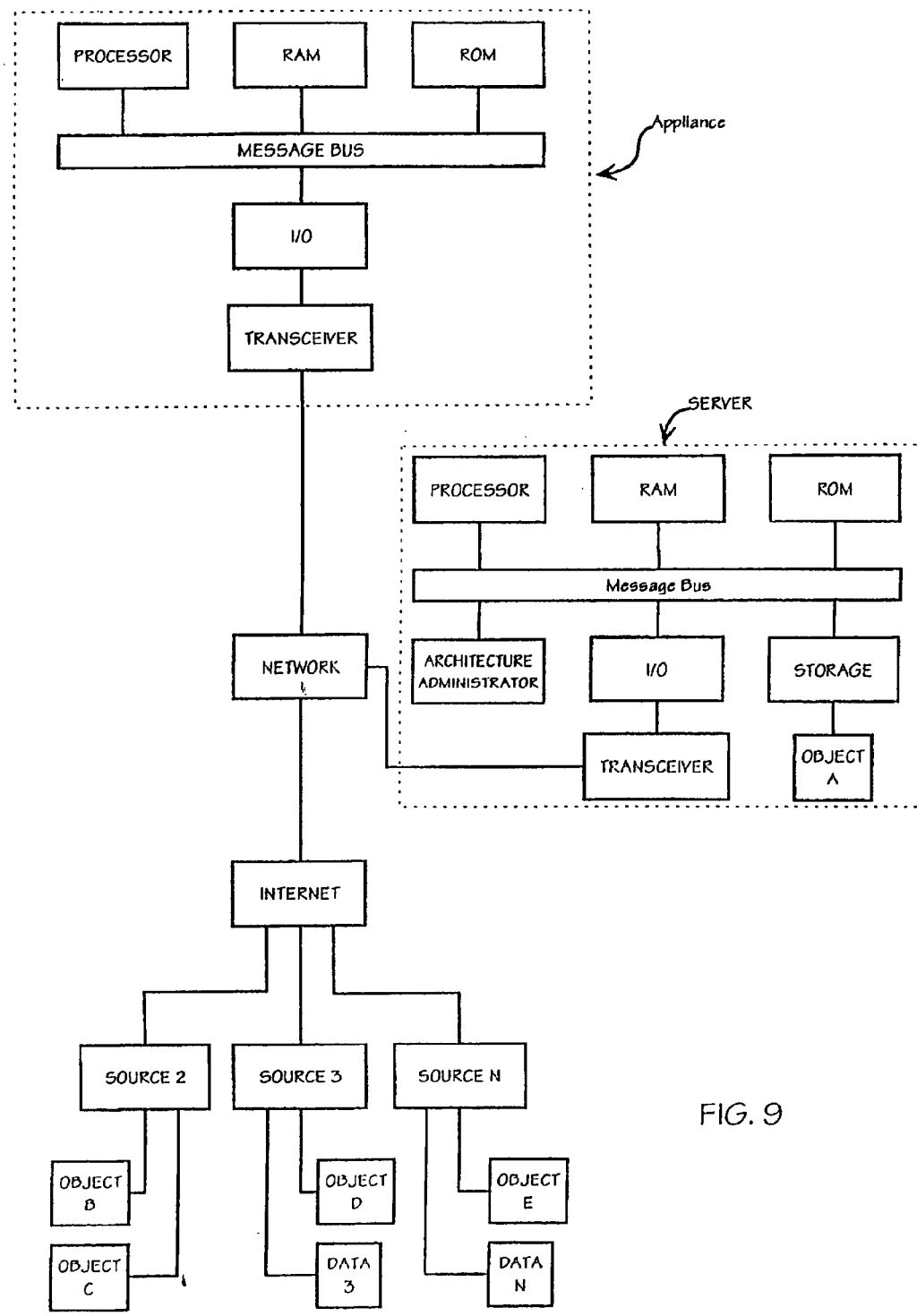
FIG. 9 is a block diagram illustrating scalable resource sharing between, for example, a "thin" information appliance within the architecture of the scalable, distributed network of the present invention.

The architecture of the present invention also enables efficient development of applications; whether work processors (e.g., word processors), video applications, games or soft appliances. The architecture of the present invention includes dynamic base-objects (DBO), an example of which is shown in FIG. 9. Each DBO implements a defined behavior, but may in addition request and use capabilities of another DBO. DBOs may also provide services to another object such as a DBO requesting another DBO.

Figure 3:
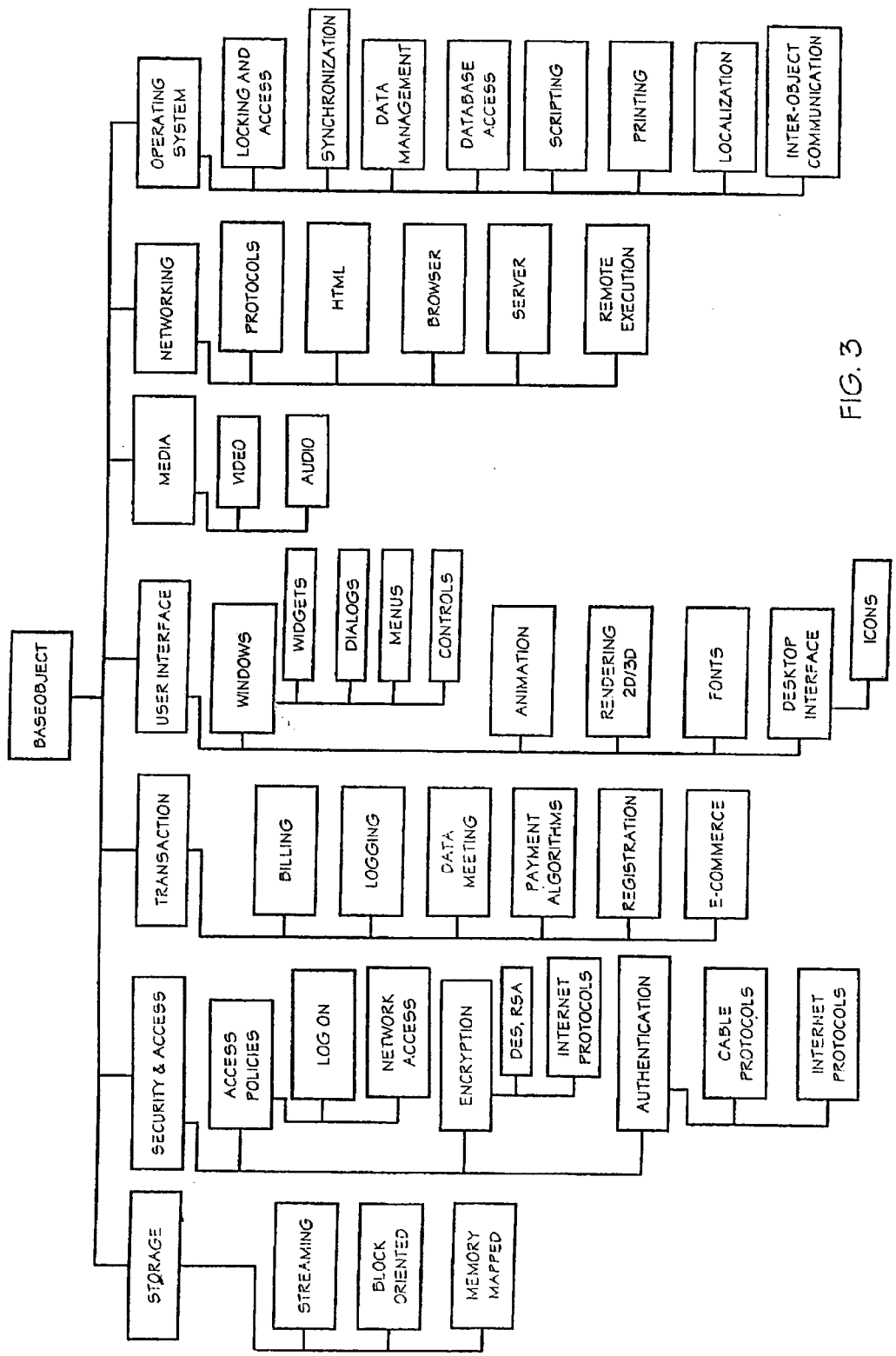
FIG. 3 is a block diagram illustrating the hierarchy of the dynamic objects which operate within the architecture of the scalable, distributed network of the present invention.

In a presently preferred embodiment of the invention a DBO may provide service routines to manage identification and communication with other DBOs. The architecture of the present invention also provides a DBO hierarchy, wherein each DBO or class within the hierarchy specializes in providing one particular type of service. A presently preferred exemplary embodiment of this hierarchy is illustrated in FIG. 3. The hierarchy of the present invention allows for features and capabilities not found in prior art object oriented programming In an exemplary embodiment of the present invention the hierarchy of the present invention allows the polymorphic and inheritance features of object oriented programming to be more fully realized. For example, in the present invention polymorphism (which allows a routine in a derived class to be redefined), and inheritance (which allows for the derivation of desired characteristics within a subclass) operate to produce object construction, implementation, and utilization without centralized control, i.e., the object hierarchy of the objects of the present invention manage object construction, implementation, and utilization.

A DBO may be either memory or disk resident. A DBO required for execution is loaded from disk if not present in memory. In a presently preferred architecture of the present invention DBOs provides at least one of the following services (1) initialization and deconstruction; (2) Encoding and decoding for network and processor transparent transport; (3) Serialization and de-serialization for persistent storage; (4) Declaration of capabilities; (5) Inquiry of capabilities of other object; (6) Addition and removal of object services; (7) Network transparency; (8) Basic transaction capability; (9) Billing and logging; (10) Object authentication; (11) Object encryption; (12) Event processing; (13) Debugging; (14) Self checking mechanism with dynamic re-start and re-initialization; (15) communication and services interface (e.g., object-to-object, user-to-object, and object-to-user).

In a presently preferred architecture of the present invention DBOs include at least one of the following properties: (1) object identification information (2) name, designer, ownership, and creation information; (3) registration information; (4) instance information; (5) access privileges; (6) security and encryption selection; (7) list of active services; and (8) locking and access primitives.

The architecture of the present invention also utilizes service objects (SOs) which may be derived or extended from DBOs. The presently preferred implementation of SO provides one or more of the following SO DBO's: (1) storage (e.g., streaming, block oriented and memory mapped) both local and networked; (2) security (access policies on local system, network privileges, and/or e-commerce privileges); (3) authentication (access privileges on local system, network privileges, and/or e-commerce privileges); (4) encryption (content or service provider security); (5) transaction; (6) billing; (7) logging and/or tracking; (8) networking including protocols, browsing, and remote execution; (9) registration; (10) inter-object communication including network traffic (11) localization; (12) media control for audio, video and graphics; and (13) operating system services such as locking and access, synchronization, scripting and printing.

The architecture of the present invention also utilizes interface objects (IOs) which may be derived or extended from DBOs. The presently preferred implementation of IO's provides one or more of the following IO DBO's (1) windows with dialogs, widgets, menus and controls; (2) animation; (3) rendering in 2D and 3D; (4) fonts rendering and management; (5) desktop interfaces; (6) media play, including video, audio and graphics; and (7) application environments.

2. The Architecture Administrator

Figure 4:
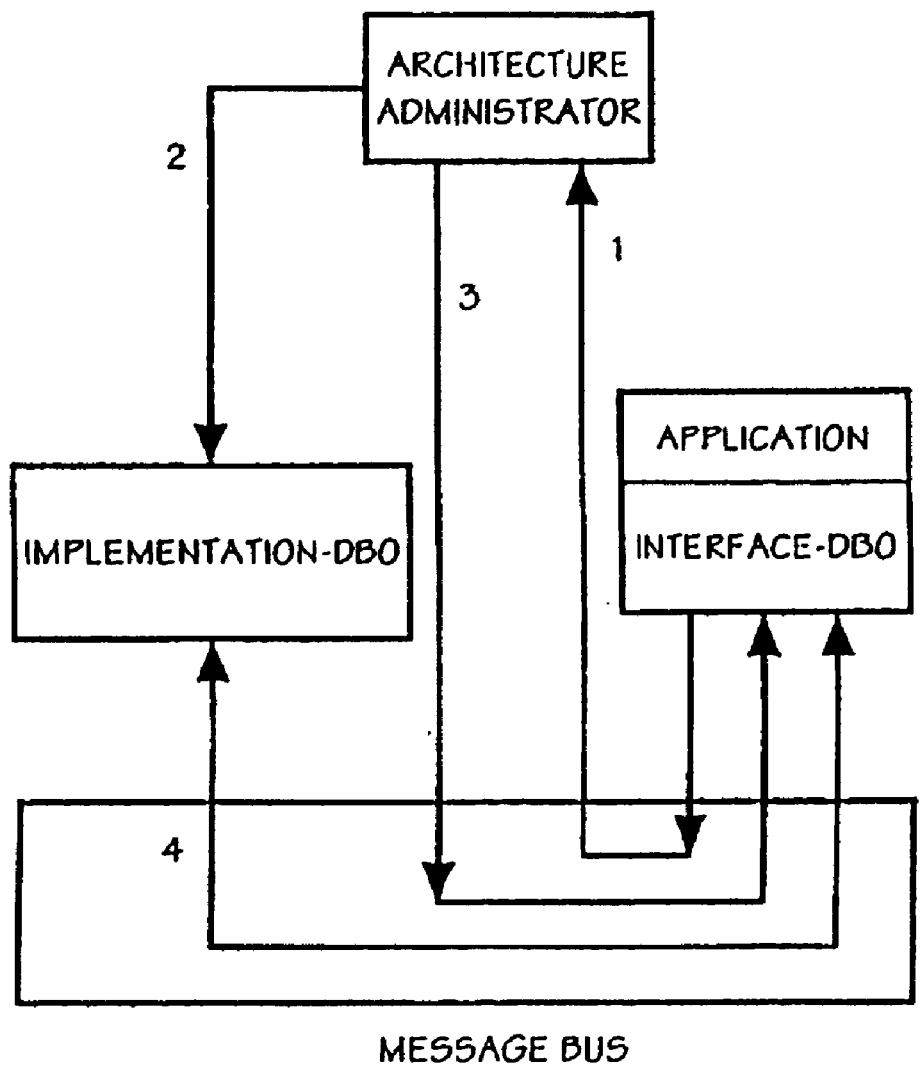
FIG. 4 is a block diagram illustrating the relationship between both implementation-dynamic-base-objects (hereinafter "implementation-DBO") and interface-dynamic-base-objects (hereinafter "interface-DBO") operating within the language neutral architecture of the scalable, distributed network of the present invention.
Figure 5:
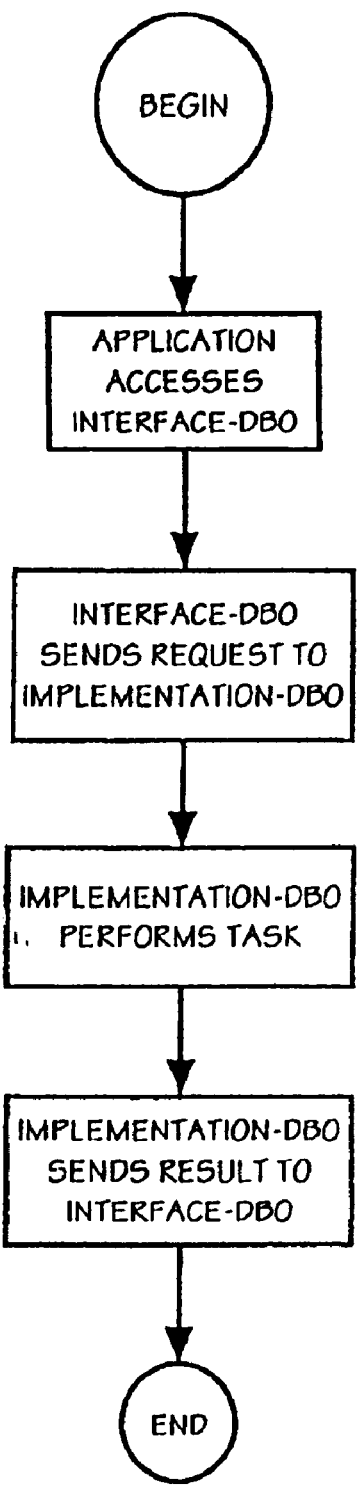
FIG. 5 is a flow diagram illustrating the operation of interface-DBOs and implementation-DBOs for providing architecture features and capabilities within the architecture of the scalable, distributed network of the present invention.
Figure 6:
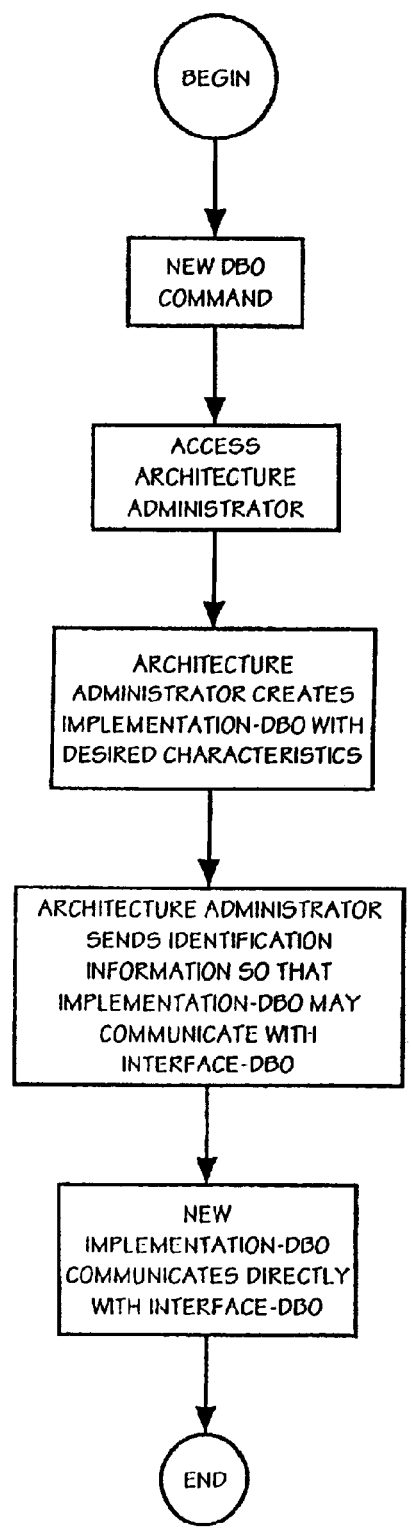
FIG. 6 is a flow diagram illustrating architecture administrator (AA) control over the creation and utilization of implementation-DBOs for providing architecture features and capabilities within the architecture of the scalable, distributed network of the present invention.
Figure 12:
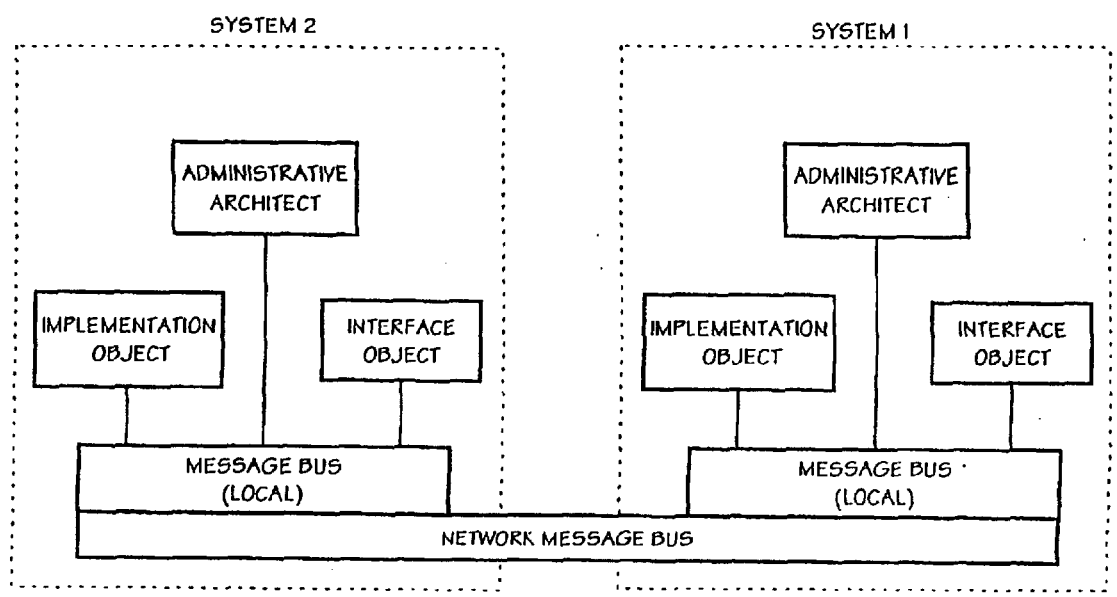
FIG. 12 is a block diagram illustrating architecture administrator (AA) control over the creation and utilization of implementation-DBOs for providing architecture features and capabilities within the architecture of the scalable, distributed network of the present invention.

In an exemplary embodiment of the architecture of the present invention when an application, for example, creates a DBO, two DBOs are actually created (FIGS. 4, 6, and 12). These two DBOs are an interface-DBO within the application, and an instance of the real DBO (a/k/a an implementation-DBO). This relationship is best illustrated in FIG. 4. For example the application may create a DBO:

AmigaObject*pAObj=new AmigaObject;

The "new" call issues a message call to the Architecture Administrator (AA) (step 1 on FIG. 4), which creates a new DBO with the desired characteristics (step 2). The object (DBO) created by AA contains the implementation. The AA then replies with "identification information" to the implementation-DBO (step 3), so that the interface-DBO and implementation-DBO can communicate (step 4). (FIGS. 4 and 6).

Figure 7:
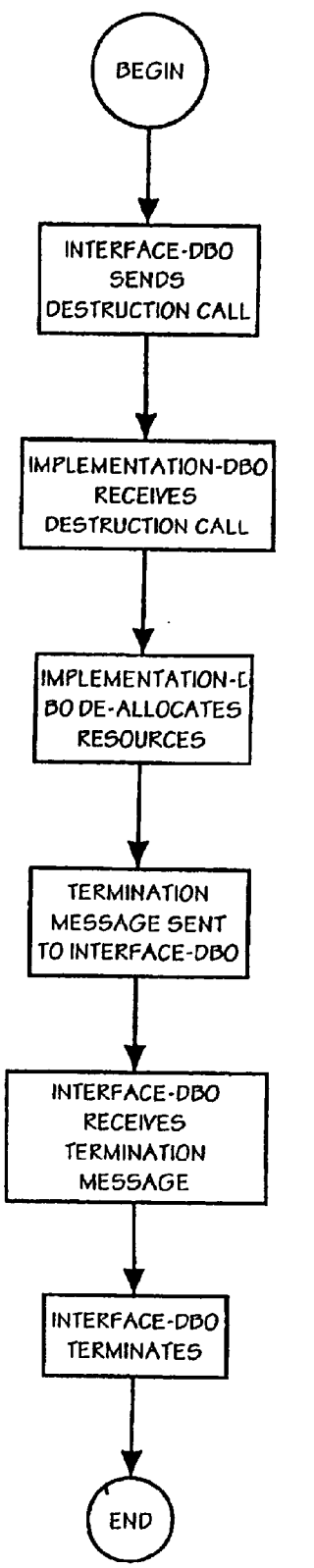
FIG. 7 is a flow diagram illustrating resource reallocation and DBO termination within the architecture of the scalable, distributed network of the present invention.

In a preferred embodiment of the invention, each time the application uses the interface-DBO, a message is sent to the implementation-DBO, which carries out the task and returns the result. When the application frees the DBO the reverse happens. The implementation-DBO gets a message call to de-allocate its resources and terminate. When the interfaced object (IO) receives the termination reply it can then safely terminate as well (FIG. 7).

Thus, the AA serves as the central "launch point" ("dispatcher") for DBOs. While the AA controls launch of DBOs, it is anticipated in a presently preferred embodiment, it will have no further involvement in DBO transactions. This is important, since to do otherwise introduces a "single-point-of-failure" in the system.

When the AA creates a new DBO it may involve loading a disk-based object. The implementation-DBO will often use resources and application programming interfaces ("APIs") provided by the underlying operating system ("OS"). Such OS resource will often be provided through shared libraries.

Figure 8:
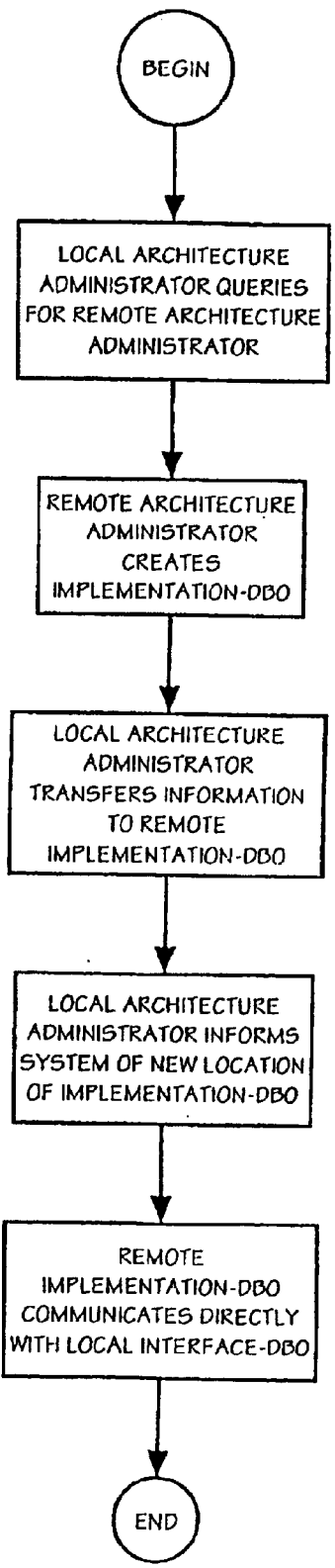
FIG. 8 is a flow diagram illustrating communication between a remote implementation-DBO and a local interface-DBO for providing architecture features and capabilities within the architecture of the scalable, distributed network of the present invention.

This architecture has a number of significant advantages:

a. The application does not embed any knowledge of the implementation of the DBO; only the interface. This allows DBOs to be updated on "the-fly" such that a DBO may automatically have an application take advantage of the update.

b. The "message bus" can be either interprocess communication ("IPC") within one system or "over the network" for two separate systems (FIG. 8).

c. The application does not need to have direct access to the resources needed to run a particular DBO. This allows for "very thin" network appliances (e.g., where the appliance has little RAM and/or ROM) (FIG. 8).

d. If the DBO is a transaction object, the implementation object may issue another network call to a service provider (e.g., a DBO service provider or DBOSP) with the particulars of the transaction.

e. The AA is involved in creating the implementation object. All further communication happens directly between the interface object and the implementation object (FIGS. 4, 6, and 12).

3. DBO Class Definition

The following examples of DBO class definitions further illustrates the scalable and distributive nature of the architecture of the present invention:

```
Class AmigaObject {
Protected:
    ID & Name
    Properties
    List of active Services
    Set and Get Properties
    Locking and Access primitives
Public:
    Constructor ()
    Destructor ()
    Encoding and Decoding
    Serialize and De-Serialize
    Interface to declare capabilities
    Interface to inquire capabilities
    Interface to add services
    Interface to remove services
    ProcessEvent ( external event)
}
```

4. DBO Nomenclature

In a presently preferred embodiment of the present invention a nomenclature or naming convention is utilized so as to facilitate operation and maintain class hierarchy. In a client/server architecture objects must be uniquely identified across the network. In an exemplary embodiment Properties and Methods are uniquely identified by using a string naming convention, that incorporates: (1) the "company or organization name" of the creator, (2) the name of the object, and (3) the name of the method or property. The nomenclature convention is: <company>.<objectname>.<method/property>".

For the property "width" in the "window" object created by amiga (after the assignee herein "AMIGA"), the name would be:

amiga.window.width

For the "Add" Method in the Math Class:

amiga.math.add

This naming convention ensures that names are unique across all systems. It should be noted in a "Distributed Computing Environment" (DCE) an algorithm exists which produces a unique 128-bit value from the ID on an Ethernet card. This ID includes, for example, the local time of day. Since Ethernet cards are not present in all systems, the use of this prior art identification is not feasible in a network containing "thin" information appliances. Furthermore, the use of the string implementation of the present invention is easier to understand.

5. Network and Endian Neutral Data Transport

Since data and commands may be flowing between systems with different processor and memory architecture we have to ensure that methods and properties are preserved as we communicate: data is therefore preferably encoded.

For each architecture (processor, memory subsystem, or the like) a family of encoding and decoding functions to encode and decode longs, shorts, double, strings, or the like is preferred. The declarations within DBOs may then appear as:

```
string      Encode (double arg);
string      Encode (long arg);
string      Encode (string arg);
...
double      DecodeDouble (string arg);
long        DecodeLong (string arg);
string      DecodeString (string arg)
```

Encode and Decode preferably follow a strict byte-order definition. In an exemplary embodiment this is implemented using strings or some set binary standard. Where string encoding is utilized applications may encode any data type necessary.

6. DBO Properties

An application operating in the architecture of the present invention may accesses properties through two methods, for example through: AmigaObject: GetProperty( ) and SetProperty ( ). The desired result is to provide a consistent interface to properties that will stay constant over time. The "preferred" implementation offers one such approach.

7. Preferred Implementation Using String-Typed Identifiers

It is presently preferred, in an exemplary embodiment of the architecture of the present invention, to utilize a string-typed identifier implementation where the application makes one call per property. DBOs contain polymorphic functions for setting and getting properties with various parameter types. The following are sample DBO declarations:

```
Int     SetProperty (string property, int value);
Int     SetProperty (string property, double value);
Int     SetProperty (string property, string str);
Int     SetProperty (string property, ATime time);
        <Similar functions for all data types>

Int     GetProperty (string property, int *pvalue);
Int     GetProperty (string property, double *pvalue);
```

Assuming it is Desirable to set Name, Access Rights, and the Creation Time of a DBO, the Code Sequence for an Application Could be:

```
SetProperty (amiga.amigaobject.name,"bob");
SetProperty (amiga.amigaobject.access,"rw");
SetProperty (amiga.amigaobject.createtime, time);
```

8. Alternate Parametric Implementation, Using Tag-lists

In another exemplary embodiment an alternative parametric tag-list implementation may be utilized. In such an embodiment the interface may be unified into two functions at the expense of lost strong typing. The declarations could be:

```
Int     SetProperty(
        PropertyID, Value
        ...,...
        NULL, NULL);
Int     GetProperty(
        PropertyID, *pValue
        ...,...
        NULL, NULL);
```

Note the dynamic character of the SetProperty( ) and GetProperty( ). It is presently preferred the PropertyID be 32-bit unsigned unique property IDs. In such an embodiment the Value is of the type indicated by PropertyID. This type of variable argument list breaks the classic object oriented methodology strong typing. To catch bugs in the parameter passing strong type checking in the message passing functions is preferred. These methods return both an integer error status and integer status. It is also possible to encode the PropertyID with information identifying the expected type of value, for example:

```
Const int long_type = 0;
Const int Char_type = 1;
Const int string_type = 2;
Const int double_type = 3;
const int CMD_SETNAME = (id)<<8 + string_type;
```

EXAMPLE

```
SetProperty(
    PROP_NAME, "bob",
    PROP_ACCESS, "rw",
    PROP_CREATETIME, time,
    NULL, NULL);
```

The interface implementation of SetProperty( ) traverses the argument list and constructs the endian neutral character string which is sent in the message pass. The implementation of GetProperty( ) in the implementation object does the exact opposite, i.e., it reconstructs the individual parameters from the message string. Preferably the parameter parsing is similar to the use of var_arg( ). This implementation also assumes all PropertyID's are unique. In a presently preferred unique numeric value proper ID's may be provided through a centralized schema or the like.

9. DBO Methods

The interface and implementation-DBOs preferably vary in their implementation. Preferably the interface DBO will be implemented as a pure message pass. For example, in a simple function called "Add" which adds to two integer values and returns the sum:

Interface AmigaObject:

```
Int   AmigaObject: :Add(int a, int b)
{
  int    sum;
  string s1 = Encode (a);
  string s2 = Encode (b);
  string reply;
  send_message (gpid_implementation_object, amiga.amigaobject.add,
    s1+s2, reply);
  sum = DecodeInt (reply);
  return sum;
}
```

For the implementation object, it's main event loop would receive the message and call a function matching the "amiga.amigaobject.add" identifier.

Implementation AmigaObject:

```
Int  implementation_add (string msg, string answer)
{
  //Extract values from msg
  int  a = DecodeInt (msg);
  int  b = DecodeInt (msg[4]);
  int  sum = a+b;
  answer = Encode (sum);
}
```

From the applications view, life is significantly simpler. Assuming that the application has a function called "SomeFunction( )", it would proceed as follows to use the AmigaObject based Add method implemented herein before:

```
Void  SomeFunction()
{
  AmigaObject  A;
  Int  sum;
  Sum = A.Add (1, 2);
}
```

While more direct methods of addition are available the example string provided several advantages transparently to the application:

a. The calculation is redirected to be performed outside the application (FIG. 8).

b. The redirection may include a network jump, i.e., the implementation may have been running on a different computer.

c. The implementation is shielded from the application, and as long as the results stay the same, the implementation may be changed, optimized and updated without application concern.

d. The implementation DBO may be replaced with an implementation DBO written in a different programming language, and as long as they both provide the same interface, the application will not know that the change took place.

10. DBO Examples

The following examples are provided to those of ordinary skill to further illustrate the power and adaptability of the architecture of the present invention:

a. We want to run a complex numerical simulation. We redirect the local "super" computer, which is operating within the architecture of the present invention.

b. We want to log onto a network. The logon object encrypts our password, negotiates with the server and finally authenticates our account. It returns with an "OK" signal, that were now ready to use network resources.

c. We want to watch a pay-per-view movie. The LogOn object works as in 2, the Billing and Logging objects connects and notifies the content provider (e.g., cable, theater, or movie company) we have an account. d. We want to surf the network with our PDA. We load a browserobject. Since we only have 1 MB of RAM on our system, the browser object connects to the Netscape browser already running on our PC. Through the transparent networking capabilities of the DBO it seems to us as if the browser is running on the PDA even though it's really running on the PC (FIG. 9).

e. A calculation that can be broken down in several independent pieces can be sent out to a network of compute devices (all with the DBO-architecture of this invention) and be performed in parallel f. Services provided through DBO's can be upgraded transparently by replacing implementation DBO's with newer and better versions.

g. DBO's can be written in any language that can process text. The interface DBO and the implementation DBO may be written in different languages.

11. DBO Persistent Storage

DBOs may be stored to a disk or the like. DBOs are standard executables, which upon initialization registers with the AA. All registration is for a particular session only. The AA scans the DBO directory upon system boot and automatically finds and catalogs the available objects. In a preferred implementation templates may be provided for DBO implementation files, such that developers may easily make their executables into DBOs. Since all property and method information is being passed as strings, any DBO may, through its capabilities interface, declare its API. This allows development tools to automatically generate header files and interface information as needed. In a preferred embodiment the directory may be "|Amiga|AmigaObjects".

12. Transparent Relocation of DBOs

The interface-DBO serves only as an interface; it contains no state information. Whereas an implementation-DBO contains all state and execution information. Thus, all execution and state information is localized. This total encapsulation allows relocating the execution of a DBO to another system.

Figure 10:
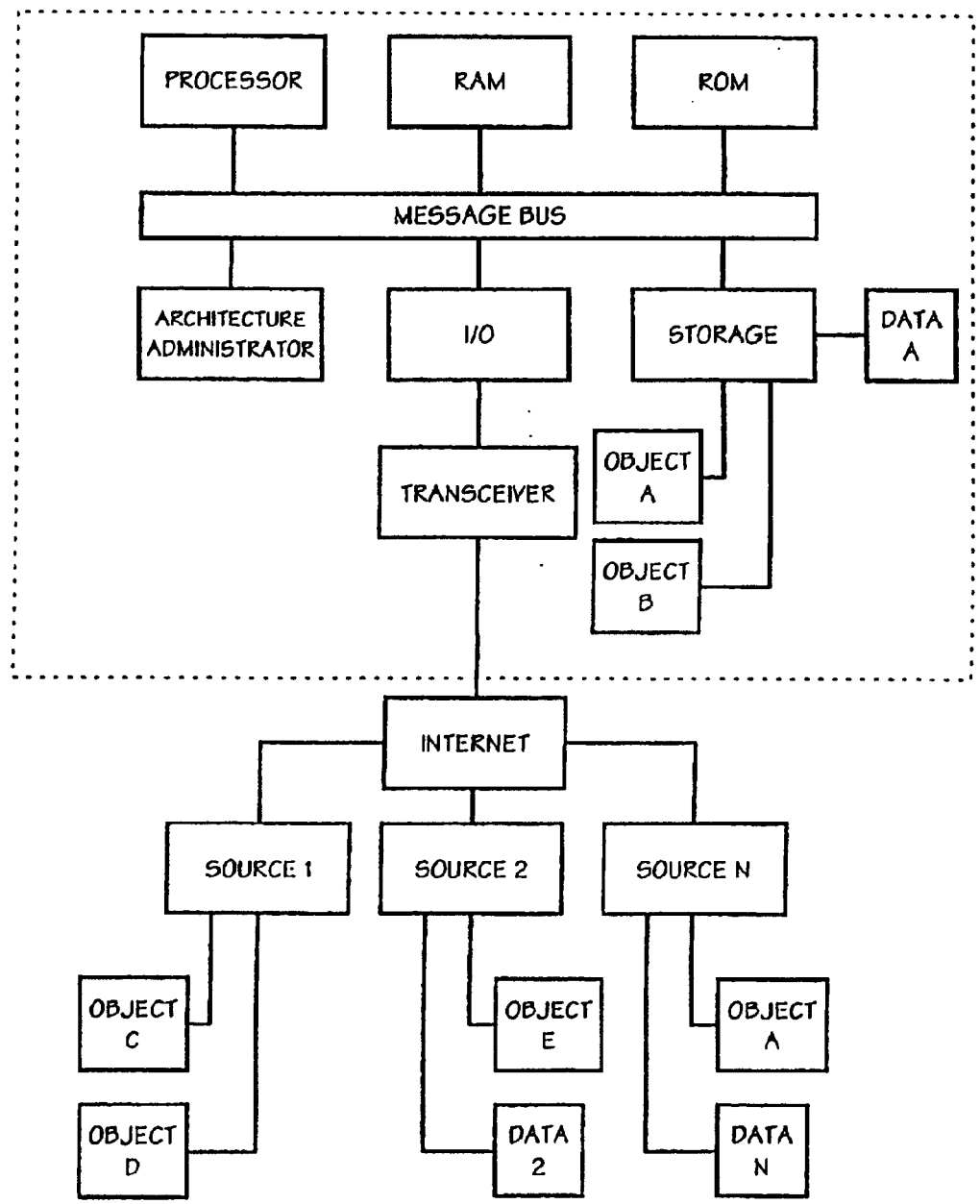
FIG. 10 is a block diagram illustrating scalable resource sharing between, for example, an information appliance within the architecture of the scalable, distributed network of the present invention.
Figure 11:
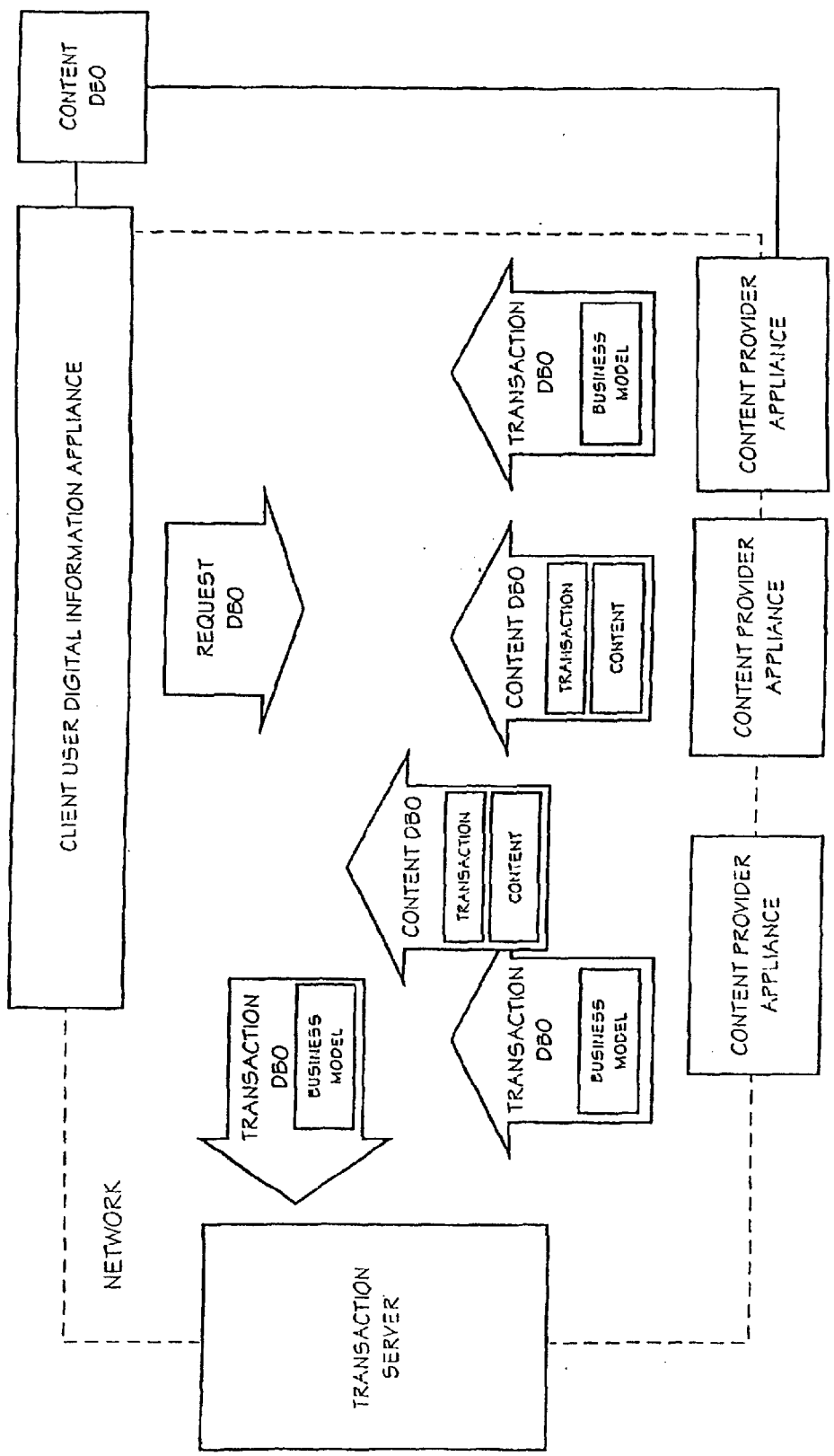
FIG. 11 is a block diagram illustrating transaction control and facilitation within the architecture of the scalable distributed network of the present invention.

In an exemplary embodiment of the architecture of the invention a local AA may request a remote AA (i.e. running on a different computer) to create an instance of the implementation object, transfer the state and execution information to the remote system, inform the interface of the next server, and terminate itself. Thus, the interface object is not necessarily connected to an implementation object running on a different computer (FIG. 10).

13. Serialization of DBOs

Serialization (de-serialization) refers to the process of packing (or unpacking) all the state information in an object. As before, the packing must be architecture and network neutral. In order to preserve all state and information related to an object, all local data and data allocated by the DBO must be preserved. Architecture and network neutrality is achieved, in a preferred embodiment, using the Encode processes set forth herein before. Serialization utilizes the same Encode processes while de-serialization utilizes the Decode methods.

The relocation of execution depends on the serialization capability of the DBO. This is how all state and data may be encapsulated in a neutral format and moved over the network.

By having each DBO know how to serialize and de-serialize itself, writing "save" and "open" functions is now more efficient. Since each object knows how to save and restore itself, the application only needs to traverse its database, and call serialize for each object and write the serialized description to disk. This is also true for restoring.

14. Implementation Objects

The following describes inheritance implementation for DBOs. DBOs are self-contained units of execution with built-in knowledge about the object hierarchy. All DBOs have encoded information identifying their parent class, if any.

Figure 13:
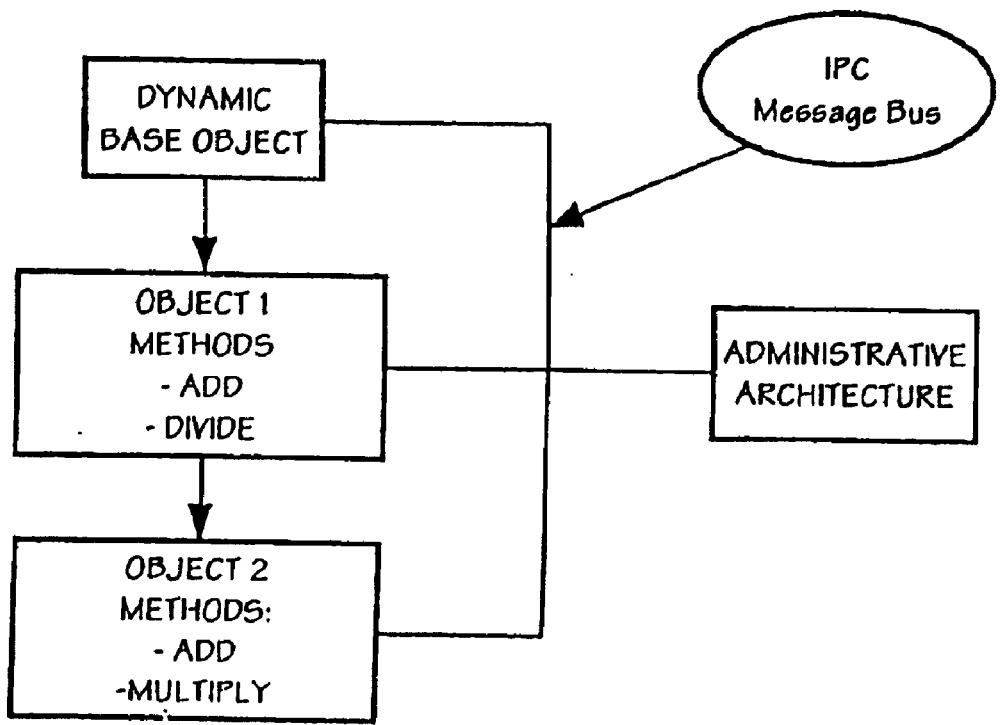
FIG. 13 is a block diagram illustrating the resolution of inheritance for implementation-objects of an embodiment of the present invention.
Figure 14:
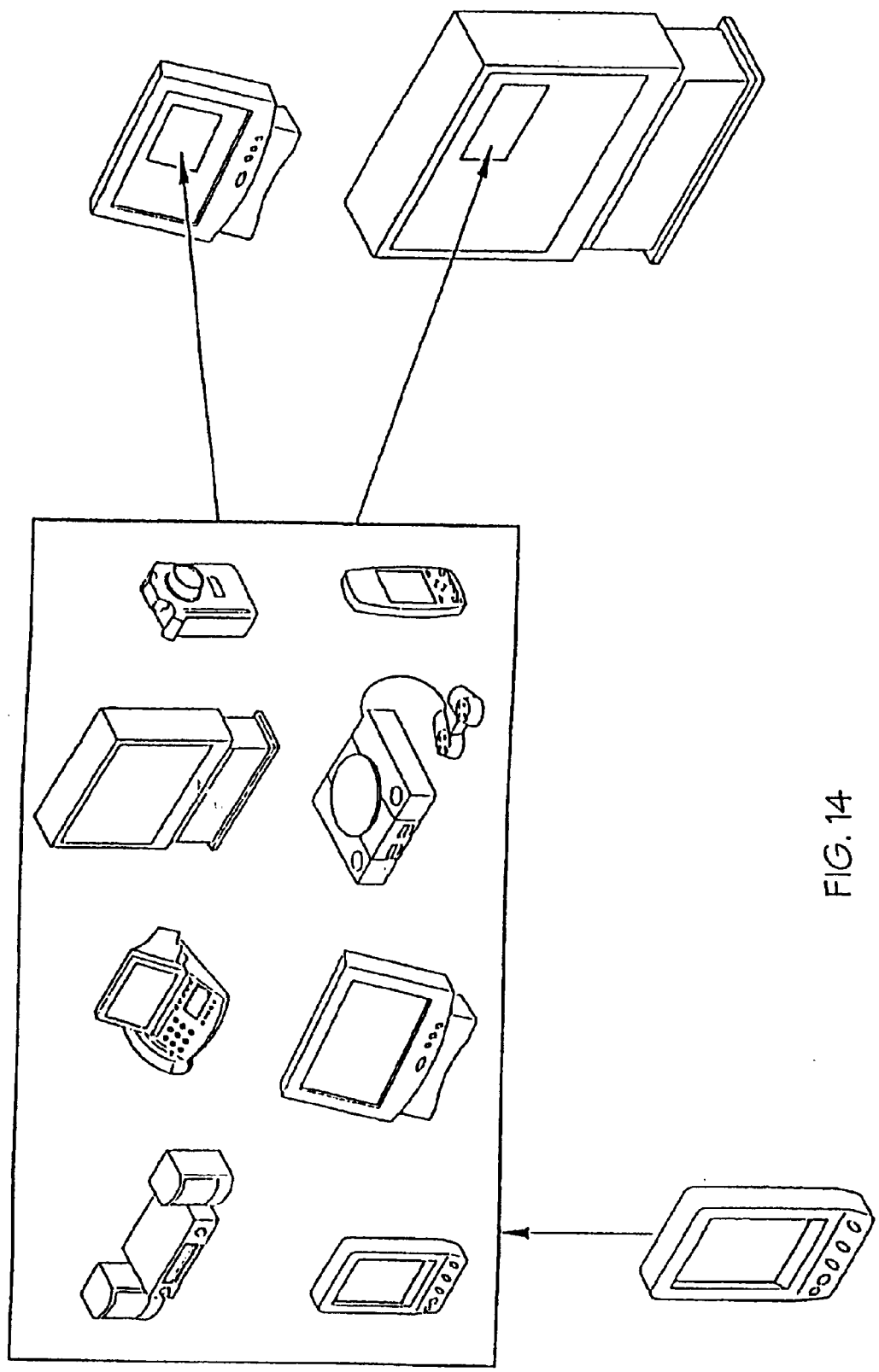
FIG. 14 is a block diagram illustrating virtual appliance operation within a network of the architecture of the present invention.
Figure 15:
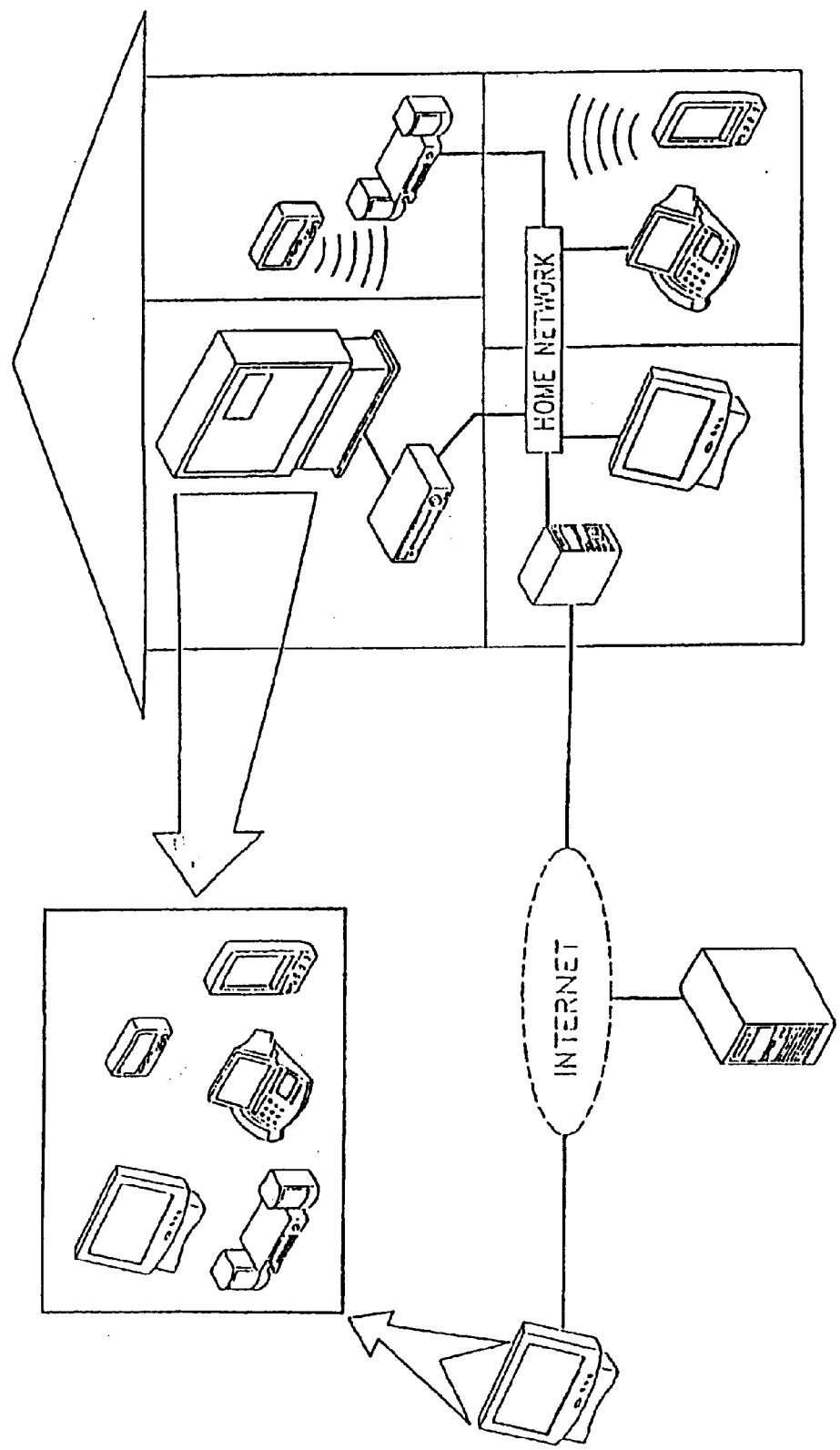
FIG. 15 is a block diagram illustrating resource scaling of virtual appliances within the architecture of the present invention.

When an object receives a message it will try to resolve the request with it's own methods. If the object does not implement the requested service, it will request help from its parent object. The object will take the result provided by the parent object and pass it back to the interface object. The parent object may similarly either provide the service or request help from it's parent. Ultimately all unfulfilled requests end up at the base DBO which either services the request or issues an error (FIG. 13).

Languages such as C++ only provide such "hierarchy-traversal" between objects that are connected at compile time. Specifically, this means that (FIG. 13) Object2, Object1 and DBO all must be compiled together into one executable for the hierarchy traversal to work. This also means, in a presently preferred embodiment, it is impossible to install a new Object1 on the system, without installing a new BaseObject and Object2. Given that every object is derived from a BaseObject, it means that all objects will have to be re-released to fix a bug or add a feature to any one object.

The architecture of the present invention provides more flexibility. For example, all objects are completely independent. Object1 can be replaced without requiring either a new BaseObject or Object2.

Using the before set forth example, the following service requests may be considered:

Case 1 Object Implements Service

Object2 receives a request to perform a "add".
  Since "add" is implemented in Object2, Object2 uses it's implementation of "add" and return the result to the interface object. Note that Object1 also implements "add", but since Object2 knows how to "add", Object1 is never involved.
Object2 receives a request to perform a "multiply":
  Since "multiply" is implemented in Object2, Object2 uses it's implementation of "multiply" and return the result to the interface object. Object1 is never involved.

Case 2 Object Does Not Implement service

Object2 receives a request to perform a "divide"
  Object2 does not implement "divide". Object2 issues a request to AA to load Object1. After loading Object1, AA passes communication information to Object2. Object2 then issues a message call to Object1 asking for service on "divide". Object1 services the request and returns the result to Object2. Next time Object2 needs to service a "divide" it is already connected to Object1 and the AA is not involved.

Due to the recursive nature of the design, the above outlined process naturally extends to any depth of hierarchy and object complexity.

15. Automatic Generation of Header Files

The implementation object contains the "master" source for the object. The interface object definition files are automatically generated from the source code of the implementation object. Embedding parent relationships and identification of public method in the source code of the implementation object is preferably utilized to indicate to extraction tools what pieces of information to extract. Sample identifiers in an exemplary embodiment include:

| Identifier | Description |
| --- | --- |
| @@PARENT=<string> | Name of parent class |
| @@OBJECTNAME=<string> | Name of this class |
| @@COMPANY=<string> | Company name for this class |

-continued

| Identifier | Description |
| --- | --- |
| @@PROPERTY=<string> | Property to be exported |
| @@METHOD=<string> function declaration | Method name to be exported. Immediately precede declaration |

The same identifiers may also be utilized to generate the string tables needed to parse incoming service requests.

16. Automatic Declaration of Capabilities

The tools that generate header files for the interface objects may also be utilized to generate a string description of all (or some) public interfaces and properties of the object. This allows other object's to inquire capabilities at run-time. It is presently preferred to utilize a standard method and property naming convention and utilize the encoding for common data types.

<companyname>.<objectname>.<method/property>return type {parameter type } *

EXAMPLE

Amiga.math.add aint32 aint32 aint32

Thus, in an exemplary embodiment for a function that returns an aint32 and takes two aint32's as parameters. Consequently, base type definitions are provided since an integer has different meanings on different architectures and operating systems.

17. Network Communication Model

An exemplary embodiment illustrating a presently preferred network communication may be found in FIG. 12. FIG. 12 diagrammatically illustrates how intra-system communication compares to inter-system communication. This may also be likened to the process describing how interface and implementation objects communicate both locally and globally (over the network).

Case 1 Interface Object on System 1 Requests Services that System 1 can Provide.

The interface object requests an instance on the implementation object through the local AA. Since the executive "knows" how to create the service, the implementation object is created and information passed back to the interface object. The AA on system 1 does not interact further in the communication between the implementation and interface object. Note that this scenario does not create any network traffic.

Case 2: Interface Object on System 1 Requests Services that System 1 Does not Provide.

The interface object requests an instance on the implementation object through the local AA. The AA is unable to create the implementation object and now broadcasts a request for service on the network. The broadcast goes to AA on other systems in the network. The executive on system 2 can provide the service. It creates an instance of the implementation object and passes the pertinent information back to the AA on system 1. The executive passes the implementation identifier back to the interface object. The interface object now communicates with its implementation using the network. Note that the implementation object does not need to know there is a network jump associated with each transaction.

18. Performance and Implementation Considerations

In a presently preferred embodiment of the architecture of the present invention, 5 a message passing engine may be utilized to provide transparent local and network communication. Objects do not need to know if they are communicating locally or globally, they just need to pass the identifiers of processes and systems to the communication routines.

For local communication it may be the sender and recipient are running on 10 identical architectures, and therefore the encoding and decoding steps may be bypassed (sending the messages as "raw" memory images). Since most messages will be local, such an optimization will provide enhanced performance.

19. The Architecture Administrator

As previously explained, the AA plays a role in the overall operation of the architecture. The AA performs the following services: (1) creates implementation DBOs; (2) scans and loads DBO definitions from disk; (3) communicate a systems DBO capabilities to other systems; (4) sends network requests for services; (5) receives and manages request for services from other systems; and (6) sends and receives for new relocation of services.

The AA serves as a focal point for the distributed processing capabilities of the architecture of the present invention. The AA does not contain system specific information-instead it relies on services provided by the implementation-DBO.

20. The Architecture Orchestrator and Scriptor

DBOs may be programmed in at least two different ways: (1) with compiled code, 25 as shown herein before; or (2) through scripting language with run-time object invocation. Since DBOs may declare their capabilities at runtime, this allows for dynamic run-time execution of DBOs. An orchestrator or language processor may provide dynamic identification of all methods and properties of all DBOs. The Orchestrator may automatically support any DBO loaded on the system. The Orchestrator may also work with the AA to identify available DBOs and load and execute them as necessary. The Scriptor may be a few lines or a complete application.

Most Script programs will likely be short and tend to focus on the creation and interaction of a modest number of DBOs; for example, small animations, user interface elements and virtual appliances. There are, however, with JAVA®, no limitations on the complexity of the Scripts which may employed. The Scriptor is both OS and processor independent. This provides a simple, consistent way to program at both the user-level through the Scriptor and at a program level through DBO interfaces. For example, to spin an object on a desktop, the Scriptor could be as follows:

‖—Rotate an object around (0, 0, 0) in it's local coordinates

‖—Until the user click on it with a mouse

AmigaObject Icon=FindAmigaObject ("demoobject");

Icon.Rotate (10, 10, 10, on_desktop, WAIT_EVENT);

The two lines do the following: the first line instructs the Orchestrator to find the object, the second line sets the rotation parameters and tells the system to let it run on the desktop (as opposed to it's own window), and instructs the object to continue until it receives an external event. If the Rotate method had the last parameter as NULL or equivalent, it would just rotate once and return to the Scriptor; instead it launches a new process and then returns.

Thus, there has been described an object driven software architecture which provides for at least all of the objects stated herein.

What is claimed is:

1. A method for executing a task in a distributed object information handling system, comprising:

calling an object to execute a task requested by an application by transferring the request to an interface object, the application being executed by a first computer system, wherein the first computer is incapable of creating an implementation object for executing the requested task corresponding to the interface object;

locating an implementation object for executing the task;

upon locating the implementation object, creating an instance of the implementation object and then passing the request from the interface object to the implementation object;

executing the task with the implementation object by a second computer system capable of creating an implementation object for executing the requested task, whereby a result of the task is produced;

passing the result from the implementation object to the interface object; and passing the result to the application.

2. A method as claimed in claim 1, further comprising the step of terminating the implementation object upon completing said step of passing the result from the implementation object to the interface object.

3. A method as claimed in claim 1, further comprising the step of terminating the interface object upon completing said step of passing the result to the application.

4. A method as claimed in claim 1, the application being executed by a first computer system, said locating step including the step of locating the implementation object in a storage device coupled with the first computer system.

5. A method as claimed in claim 1, the application being executed by a first computer system, said locating step including the step of locating the implementation object in a storage device coupled with a second computer system, the second computer system being remotely located from the first computer system and coupled with the first computer system via a network.

6. A method as claimed in claim 1, the application being executed by a first computer system, said locating step including the steps of first locating the implementation task in a storage device coupled to the first computer system, and, in the event the implementation is not found, locating the implementation object in a storage device coupled to a second computer system, the second computer system being coupled to the first computer system via a network.

7. A method as claimed in claim 1, further comprising the steps of locating two or more implementation objects, selecting an optimal one of the two or more implementation objects, and then executing said executing step with the optimal one of the two or more implementation objects.

8. A method as claimed in claim 1, wherein the interface object contains no state information.

9. A method as claimed in claim 1, wherein the implementation object contains execution and state information.

10. A method as claimed in claim 1, further comprising the step of passing identification information to the implementation object for identifying the interface object whereby the implementation object and the interface object may communicate.

11. A method as claimed in claim 1, the application and the interface object being executed by a first computer system and the implementation object being executed by a second computer system coupled with the first computer system via a network, wherein the implementation object utilizes at least one resource of the second computer system to execute said executing step.

12. A method as claimed in claim 1, the application and the interface object being executed by a first computer system and the implementation object being executed by a second computer system coupled with the first computer system via a network, wherein the implementation object utilizes at least one application programming interface of the second computer system to execute said executing step.

13. A distributed object information handling system, comprising:

an interface object for interfacing with an application, the interface object operational on a first computer system that is incapable of creating an implementation object for executing a requested task corresponding to the interface object;

a message bus for passing information between said interface object and an implementation object, the implementation object operating on a second computer system capable of creating the implementation object for executing the task requested by the interface object; and an executive for locating said implementation object which is executable on said second computer system which was not executable by said first computer system, and upon locating said implementation object such that said implementation object executes a task requested by the application and passes a result of the task to the application via said interface object.

14. A distributed object information handling system as claimed in claim 13, the application being executable by a computer system and said message bus being implemented within the computer system.

15. A distributed object information handling system as claimed in claim 13, the application and said interface object being executable by a first computer system and said implementation object being executable by a second computer system remotely located from the first computer system, said message bus being implemented across a network coupling the first and second computer systems.

16. A distributed object information handling system as claimed in claim 13, the application and said interface object being executable by a first computer system and said implementation object being executable by a second computer system remotely located from the first computer system, said message bus being implemented across a network coupling the first and second computer systems, the distributed information handling system further comprising a second executive executable by the second computer system, wherein said second executive creates an instance of said implementation object upon locating said implementation object such that said implementation object executes a task requested by the application and passes a result of the task to the application via said interface object.

17. A distributed object information handling system as claimed in claim 13, said message bus being implemented across a world-wide network.

18. A distributed object information handling system as claimed in claim 13, said message bus being implemented across the INTERNET.

19. A distributed object information handling system as claimed in claim 13, said interface object containing no state information.

20. A distributed object information handling system as claimed in claim 13, said executive providing identification information to said implementation task for identifying said interface object such that said implementation object and said interface object may communicate via said message bus.

21. A distributed object information handling system as claimed in claim 13, wherein said implementation object dynamically invokes parent classes.

22. A distributed object information handling system as claimed in claim 21, wherein parent object may be implemented across the network.

23. A distributed object information handling system as claimed in claim 13, wherein said implementation object manages through at least one of compiled source code and run-time scripting.

* * * * *